United States Patent
Ruehle

(10) Patent No.: US 9,251,440 B2
(45) Date of Patent: Feb. 2, 2016

(54) MULTIPLE STEP NON-DETERMINISTIC FINITE AUTOMATON MATCHING

(71) Applicant: Intel Corporation, Santa Clara, CA (US)

(72) Inventor: Michael Ruehle, Albuquerque, NM (US)

(73) Assignee: Intel Corporation, Santa Clara, CA (US)

( * ) Notice: Subject to any disclaimer, the term of this patent is extended or adjusted under 35 U.S.C. 154(b) by 518 days.

(21) Appl. No.: 13/718,948

(22) Filed: Dec. 18, 2012

(65) Prior Publication Data

US 2014/0173603 A1 Jun. 19, 2014

(51) Int. Cl.
| | | |
|---|---|---|
| G06F 15/173 | (2006.01) | |
| G06K 9/68 | (2006.01) | |
| H04L 29/06 | (2006.01) | |
| G06F 17/30 | (2006.01) | |

(52) U.S. Cl.
CPC .............. *G06K 9/6878* (2013.01); *G06F 17/30* (2013.01); *H04L 69/22* (2013.01)

(58) Field of Classification Search
CPC ....... G06F 9/444; G06K 9/6878; H04L 69/22
USPC ......................................................... 709/238
See application file for complete search history.

(56) References Cited

U.S. PATENT DOCUMENTS

| | | | |
|---|---|---|---|
| 5,937,181 A * | 8/1999 | Godefroid et al. .............. 703/22 |
| 7,119,577 B2 * | 10/2006 | Sharangpani .................... 326/46 |
| 7,805,392 B1 * | 9/2010 | Steele et al. .................... 706/48 |
| 7,945,528 B2 * | 5/2011 | Cytron et al. ................... 706/62 |
| 8,024,802 B1 * | 9/2011 | Preston ........................... 726/22 |
| 8,051,085 B1 * | 11/2011 | Srinivasan et al. ............ 707/737 |
| 8,862,603 B1 * | 10/2014 | Watson et al. ................. 707/758 |
| 8,964,548 B1 * | 2/2015 | Keralapura et al. ........... 370/235 |
| 2001/0014936 A1 * | 8/2001 | Jinzaki .......................... 711/221 |
| 2004/0215593 A1 * | 10/2004 | Sharangpani et al. ............ 707/1 |
| 2005/0012521 A1 * | 1/2005 | Sharangpani et al. .......... 326/46 |
| 2006/0136570 A1 * | 6/2006 | Pandya ......................... 709/217 |
| 2006/0277534 A1 * | 12/2006 | Kasuya ......................... 717/143 |
| 2008/0071780 A1 * | 3/2008 | Ichiriu et al. ..................... 707/6 |
| 2008/0109431 A1 * | 5/2008 | Kori ................................. 707/6 |
| 2008/0140600 A1 * | 6/2008 | Pandya ........................... 706/47 |

(Continued)

OTHER PUBLICATIONS

Morita, et al. (Apr. 1994). Parallel generation and parsing of array languages using reversible cellular automata. International Journal of Pattern Recognition and Artificial Intelligence, 8(02), 543-561.*

*Primary Examiner* — Kristie Shingles
*Assistant Examiner* — Timothy Sowa
(74) *Attorney, Agent, or Firm* — Barnes & Thornburg LLP

(57) ABSTRACT

Disclosed is a hardware NFA cell array used to find matches to regular expressions or other rules in an input symbol stream. The cell array scans multiple symbols per clock cycle by comparing multiple symbol classes against multiple input symbols per cycle in parallel, signaling bundles of multiple transitions from parent cells to child cells and updating NFA state status by multiple steps. To retain high frequency operation, the cell array will not resolve transition chains from a first cell to a second cell to a third cell in a single cycle. When a chain is required, the cell array takes fewer steps in one cycle to break the chain into separate cycles. To detect multi-transition chains, each cell compares symbol classes to future symbols in advance and back-communicates future match positions to parent cells in the array as launch hazards.

19 Claims, 3 Drawing Sheets

(56) References Cited

U.S. PATENT DOCUMENTS

| | | | |
|---|---|---|---|
| 2008/0270342 A1* | 10/2008 | Ruehle | 707/1 |
| 2008/0271141 A1* | 10/2008 | Goldman et al. | 726/22 |
| 2009/0063825 A1* | 3/2009 | McMillen et al. | 712/220 |
| 2009/0327252 A1* | 12/2009 | Zhang et al. | 707/4 |
| 2010/0192225 A1* | 7/2010 | Ma et al. | 726/23 |
| 2011/0022617 A1* | 1/2011 | Yamagaki | 707/758 |
| 2011/0145181 A1* | 6/2011 | Pandya | 706/27 |
| 2011/0219208 A1* | 9/2011 | Asaad et al. | 712/12 |
| 2011/0307433 A1* | 12/2011 | Dlugosch | 706/45 |
| 2012/0330868 A1* | 12/2012 | Tago et al. | 706/12 |
| 2013/0111503 A1* | 5/2013 | Tago et al. | 719/318 |
| 2014/0229926 A1* | 8/2014 | Xu et al. | 717/150 |

* cited by examiner

US 9,251,440 B2

MULTIPLE STEP NON-DETERMINISTIC FINITE AUTOMATON MATCHING

FIELD OF THE INVENTION

The field of the invention relates generally to computer technology and more specifically to processing symbols.

BACKGROUND OF THE INVENTION

With the maturation of computer and networking technology, the volume and types of data transmitted on the various networks have grown considerably. For example, symbols in various formats may be used to represent data. These symbols may be in textual forms, such as ASCII, EBCDIC, 8-bit character sets or UNICODE multi-byte characters, for example. Data may also be stored and transmitted in specialized binary formats representing executable code, sound, images, and video, for example. Along with the growth in the volume and types of data used in network communications, a need to process, understand, and transform the data has also increased. For example, the World Wide Web and the Internet comprise thousands of gateways, routers, switches, bridges and hubs that interconnect millions of computers. Information is exchanged using numerous high level protocols like SMTP, MIME, HTTP and FTP on top of low level protocols. Further, instructions in other languages may be included with these standards, such as JAVA and VISUAL BASIC. There are numerous instances when information may be interpreted to make routing decisions. In an attempt to reduce the complexity associated with routing decisions, it is common for protocols to be organized in a matter resulting in protocol specific headers and unrestricted payloads. Subdivision of the packet information into packets and providing each packet with a header is also common at the lowest level, for example TCP/IP. This enables the routing information to be at a fixed location thus making it easy for routing hardware to find and interpret the information.

SUMMARY OF THE INVENTION

An embodiment of the invention may therefore comprise a method of multiple step NFA matching of input symbols in an NFA cell array, comprising consuming at least two successive input symbols in a first clock cycle at each cell in the cell array, comparing at least one symbol class in a cell in a second clock cycle with the at least two successive input symbols, emitting at least two output transitions from the cell in a third clock cycle corresponding to successive symbol positions, the output transitions being destined to a same destination cell, performing status updates in the cell in the third clock cycle, and receiving at least two input transitions in the cell in the third clock cycle corresponding to successive symbol positions, the input transitions being received by the cell and from a same emitting cell.

An embodiment of the invention may further comprise a system for multiple step matching of input symbols, the system comprising an NFA cell array enabled to transmit bundles of multiple transition signals from parent cells to child cells in the cell array, compare character classes in the cells against multiple input symbols in parallel, generate out-transitions from the cells for multiple symbol steps in a single cycle, and receive in-transitions into the cells for multiple symbol steps in a single cycle, and a step size selector enabled to receive slow down requests from each cell in the cell array to determine a proper step size for each cycle in the NFA cell array.

DETAILED DESCRIPTION OF THE EMBODIMENTS

Figure 1:
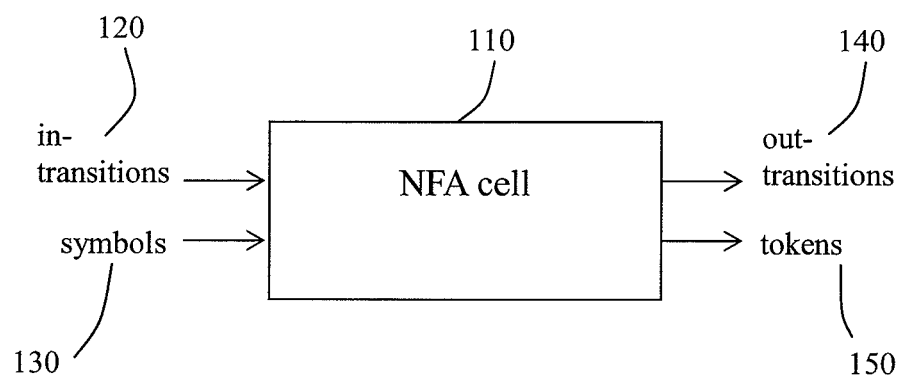
FIG. 1 is a block diagram of an NFA cell array.

With the increasing nature of the transmission of information, there is an increasing need to be able to identify the contents and nature of the information as it travels across servers and networks. Once information arrives at a server, having gone through all of the routing, processing and filtering along the way, it is typically further processed. This further processing necessarily needs to be high speed in nature.

The first processing step that is typically required by protocols, filtering operations, and document type handlers is to organize sequences of symbols into meaningful, application specific classifications. Different applications use different terminology to describe this process. Text oriented applications typically call this type of processing lexical analysis. Other applications that handle non-text or mixed data types call the process pattern matching.

Performing lexical analysis or pattern matching is generally a computationally expensive step. This is because every symbol of information needs to be examined and dispositioned.

Regular expressions are used for pattern matching and lexical analysis. Regular expressions provides a concise and flexible means for "matching" strings of text, such as particular characters, words, or patterns of characters. Abbreviations for "regular expression" include "regex" and "regexp" and these abbreviations may be used throughout this specification interchangeably with each other and with the term "regular expression". A regular expression is written in a formal language that can be interpreted by a regular expression processor, which can be a program that examines text or other characters in and identifies parts that match the provided rules of the regular expression. A regular expression in its simplest expression is a pattern. It is an expression that specifies a set of strings.

Examples of specifications that could be expressed in a regular expression are as follows:
  the sequence of characters "car" appearing consecutively in any context, such as in "car", "cartoon", or "bicarbonate"
  the sequence of characters "car" occurring in that order with other characters between them, such as in "Icelander" or "chandler"
  the word "car" when it appears as an isolated word
  the word "car when preceded by the word "blue" or "red"
  the word "car" when not preceded by the word "motor"
  a dollar sign immediately followed by one or more digits, and then optionally a period and exactly two more digits (for example, "$100" or "$245.98").

These sequences are simple and are intended only for purposes of example. Specifications of great complexity are conveyable by regular expressions.

Regular expressions are used by many text editors, utilities, and programming languages to search and manipulate text based on patterns. Some of these languages, including PERL, RUBY, AWK, and Tcl and may integrate regular expressions into the syntax of the core language itself. Other programming languages like .NET languages, JAVA, and PYTHON provide regular expressions through standard libraries.

To match regular expressions or similar pattern matching rules, two main types of state machines may be constructed, non-deterministic and deterministic finite automata (NFAs and DFAs). NFAs for multiple rules are commonly executed separately, either in a sequential manner as in software, or in a parallel manner as in hardware.

Abstractly, an NFA is a directed graph of NFA states in which each graph edge is labeled with a class of input symbols that it accepts. Each edge represents a transition from a source state to a destination state on that symbol class. One or more "start states" are understood to be "active" at the beginning of a stream (or sequence) of input symbols or characters. As each symbol in the stream is consumed, an active state may transition to a destination state along a graph edge labeled with a class containing that symbol. The destination state becomes active after that symbol. The class of symbols labeling an NFA transition may be called a character class, or CCL.

According to the "Thompson" method of executing NFAs, as each input symbol is consumed, all transitions from each active state which are labeled with CCLs containing (or "matching") the symbol are taken together. This may potentially activate multiple destination states at once. A hardware NFA engine may be constructed to execute NFAs according to the Thompson method. In such an engine, multiple NFA cells exist as physical logic within a cell array. Each cell is configured to track one or more NFA states derived from the rules. The states tracked by a cell may be active or inactive. Cells are able to signal other cells and activate them. Such signals represent state transitions. The cell array is initialized with start states active. Input symbols or information corresponding to those symbols are broadcast to the cells. Logic associated with each transition is configured to detect the proper symbol class and examines each input symbol to determine if it belongs to the transition class. Whenever a state is active and the next symbol matches a transition class, a signal is sent to the destination cell.

The NFA cell array may be statically configured with an entire NFA before scanning an input stream. In such a system, every NFA state is represented by some cell. In U.S. Pat. No. 7,899,904, to Ruehle, incorporated herein in its entirety, cells may be dynamically reconfigured on demand during a scan. The cell array does not need to be large enough for the entire NFA. The cell array only needs to be large enough for the expected size of active state subsets achieved during a scan. When a cell is dynamically configured, signal connections are configured between a cell and its destination source states in the cell array.

In a system comprising an NFA cell array, whether statically or dynamically configurable, high aggregate performance across multiple scanned input streams can be achieved by high-level parallelism. Multiple cell arrays may be replicated in such a system until the required aggregate performance is achieved. Additionally, if an NFA cell array can be constructed to scan multiple symbols per cycle, efficiency of physical logic utilization can increase so that a given aggregate performance level can be achieved with a lower cost of cell array logic. Some approaches to achieve multiple symbols per cycle scan array performance may have been tried. One approach is to design the cell array logic to perform in one clock cycle the same operations that would occur in two single-symbol cycles, employing as much hardware parallelism as possible. Another approach is to construct an NFA using a different symbol alphabet, where each modified symbol comprises multiple ordinary symbols. For example, if the ordinary symbol alphabet is the set of 26 letters 'A' to 'Z;' the modified alphabet could be the set of 26×26=676 two-letter pairs, "AA", "AB", . . . , "ZY", "ZZ". A given rule set could be compiled into an NFA employing the multi-symbol alphabet and an NFA cell array constructed to scan at a rate of one modified symbol per cycle. This is equivalent to multiple ordinary symbols per cycle.

In an embodiment of the invention, a hardware NFA cell array consumes a maximum of N>1 input symbols per clock cycle. It is able to sustain almost N symbols per cycle average scan speed under reasonable conditions. It can be constructed with maximum operating frequency close to that of a 1 symbol per cycle version and with logic area substantially less than N times that of a 1 symbol per cycle version.

Under a Thompson NFA execution algorithm employed by an NFA cell array, each cell containing an NFA state may be active or inactive at each position in the input symbol stream. A cell may send a transition signal to itself or other cells containing child (destination) states. This will result in activation of the next states at the next input symbol position. The out-transition signals are sent when the cell is active and a transition symbol class (CCL) compared with the current input symbol is seen to match. A cell containing an accepting state may also complete a rule match when it is active and generate an output event such as a token. A cell may also receive transition signals from parent (source) states resulting in activation at the next symbol position. In some cell array architectures, each cell may be able to represent a complex state comprising a sub-graph of multiple classical NFA sub-states, which may each be active or inactive, so that the status of an active cell is a complex status. In such complex cells, additional CCLs may be tested against each input symbol for internal sub-state transitions, and an out-transition may require a particular sub-state to be active. In some architectures, a complex cell may receive and examine a window of K input symbols rather than just the current symbol. The process to update a cell for a step from one input symbol position to the next thus minimally involves receiving any input transition and activating the cell or some sub-state in response but may also involve updating complex state status according to standard theory of execution of a corresponding NFA sub-graph.

FIG. 1 is a block diagram of an embodiment of an NFA cell array. Each NFA cell 110 can be considered as a black box for purposes of example. The cell 110 receives in-transition signals 120 and input symbols 130. The cell 110 emits out-transition signals 140 and tokens 150. Inside the cell 110, there may be a simple, or complex, NFA state configuration. This may include transition CCLs, and the NFA cell 110 examines the input symbols including comparing them to transition CCLs, tracks some simple, or complex, status (minimally—active or inactive) in response to in-transition signals 120 and input symbol 130 stimulus and CCL comparisons. It then emits tokens 150 and out-transition signals 140 in response to internal status and CCL comparisons.

For an NFA cell 110 to process N input symbol steps in one cycle, all of the general activity described in connection with FIG. 1 is proportionally increased. Each cell 110 may receive a bundle of N in-transition signals in place of each in-transition signal 120 which would be received by a single-step version. Each signal in the bundle represents a state in-transition at the corresponding input step from 1 to N. Each cell receives N new inputs symbols per cycle, rather than just one. If the single-step version receives a window of K symbols, then N-step version receives a window of K=N=1 symbols. Each cell may emit up to N tokens per cycle, rather than just one, with each token output signal representing a rule match completing at the corresponding input step from 1 to N. Each cell transmits a bundle of N out-transition signals, in place of each out-transition signal 140 that a single-step version would transmit, with each signal in a bundle representing a state out-transition at the corresponding input step from 1 to N. Internally, each transition CCL is compared with N input symbols per cycle instead of just one. Such comparisons may be performed in parallel. There may be an intermediate cell status between successive steps, which may be explicitly computed inside the cell. Only the final status would be stored at the end of the clock cycle.

The internal cell operations described above can be implemented to run nearly equal in speed to a single-step version. A single-step cell design may operate at 500 MHz, a 2 ns period, and emit an out-transition signal early in the cycle, such as after 0.2 ns. The single-step version may also expect to receive an in-transition signal mid-cycle, such as at the 1.2 ns point, and may expect to complete status update operations late in the cycle such as 1.8 ns. An N=2 step version can be implemented with roughly the same timing. The emitting of N out-transitions can be expected at 0.2 ns, receiving all N in-transitions can be expected at approximately 1.2 ns, and completing the N-step status update can be expected approximately a little later, at 1.9 ns, for example. Operating frequency of this N-step version may thus maintain the same 500 MHz since 1.9 ns remains shorter than the 2 ns clock period, or frequency may be reduced slightly to 475 MHz, for example, to obtain a 2.1 ns clock period and maintain a 0.2 ns margin. Inter-cell transition signals are expected to transmit in parallel with equivalent timing, not in sequence or with substantially staggered timing. Various standard high-frequency logic design techniques can be applied to achieve N-step cell timing similar to 1-step timing as described. CCL comparisons are advantageously pipelined upstream, performed at least one cycle early (there is no difficulty in examining input symbols early), with comparison results registered at the beginning of the primary step cycle. Multiple status update results can be computed speculatively early in the step cycle, pertaining to different possible in-transition combinations that may be received, and the correct results selected after they arrive. The speculative result of multiple updates may be computed directly rather than iteratively. For example, a complex cell tracking a quantified CCL ("spinner") [A] {n,m} may add N to the previous spin count directly, rather than incrementing N times.

At the cell array level, the N-step upgrade may be performed. A window of N (or K+N−1) input symbols is broadcast to each cell. This is in contrast to 1, or K, symbols. Bundles of N transition signals are routed identically from one cell to another cell through the transition network. The routing is performed by a crossbar as described in the '904 patent. N tokens, or match signals, are received each cycle from each cell. This is in contrast to the one-one token or match signal.

In a single-step cell, an in-transition signal may impact the computed internal cell status registered at the end of the clock cycle. This may be such as making the cell active at the next input position. But, an in-transition will never impact an out-transition in the same clock cycle. Each out-transition is determined by input symbol comparisons, as well as by the current cell status. This in turn is determined by in-transitions of previous clock cycles. It is not determined by in-transitions in the current clock cycle. This is because each NFA state transition (compiled without epsilon transitions) must consume an input symbol. The current cycle in-transitions are actively consuming the same current symbol so they cannot impact the current cycle out transitions which are also consuming the same current symbol. This independence of out-transitions from current in-transitions allows for the cell timing described, in which out-transitions are emitted earlier in the cycle (e.g. 0.2 ns into the cycle) than in-transitions (e.g. 1.2 ns into the cycle). Out-transitions in any cycle need to remain independent of in-transitions in the same cycle.

In an example of an NFA cell array, if N=2, and the input symbols 'a' and 'b' are consumed in a 2-step cycle, a cell representing an NFA state may receive an in-transition at the 'a' position. The state will become active as a result. The 'b' will be matched with a transition CCL and cell array will emit an out-transition at the 'b' position. Accordingly, when N>1, out-transitions may not be independent of in-transactions within the same cycle.

Each N-step NFA cell is implemented in such a way that out-transitions are independent of in-transitions in the same cycle. Out-transitions are generated using an assumption in the cells that no in-transitions are received. This permits N-step cells to be designed with near 1-step timing. To prevent resultant improper matching behavior by diverging from standard NFA execution, the N-step cell array is implemented to take a smaller step than N symbols (as small as 1 symbol) as necessary to avoid unit out-transition signals that should have been different if in-transitions signals were taken into account in the same cycle. Whenever it is determined that any cell will receive an in-transition corresponding to one step in a cycle, which should cause an out-transition corresponding to a later step potentially in the same cycle, then the cell array steps fewer than N positions in that cycle. The step will stop before the position of the out-transition in question. Basically, the NFA cell array is enabled to detect that a multi-cell transition chain will be attempted within a particular clock cycle. The multi-stepping is slowed down to take smaller step sizes to get proper matching and transition behavior.

For example, a value of N=2 is used. This means the cell array is able to take 1-symbol steps and 2-symbol steps. For N>2, at a minimum, the array must be able to take a 1-symbol step and N-symbol steps. Also, the array may also be able to take intermediate sized steps. The 1-symbols step size is essential because the case of a first-step in-transition causing a second-step out-transition may arise. If only 1-symbol and N-symbol steps are available and a later out-transition is potentially problematic, it may be resolved by successive 1-symbol steps if necessary. It is understood that performance improvement will result if intermediate step sizes are available.

For example, a value of N=2 with a sub-expression "abc" to match can be considered. Cell A will be configured to match [a] and transition to cell B. Cell B will be configured to match [b] and transition to cell C. If 'abc' appears in the input stream where state A is active such that the A→B→C transition chain should occur, the 'a' symbol transition may fall in the first step of a clock cycle. It may also fall in the second step of a clock cycle depending on the positioning of the 'abc' in the input stream. If 'a' is the first step, then the issue arises that state B is supposed to receive an in-transition from cell A on 'a' at the first step. State B is then supposed to send a resultant out-transition to C on 'b' at the second step. However, B cannot do this. The cell array detects this condition and slows execution to take only one step on the first cycle, just the 'a'. The next cycle, state B is active as a result, and can out-transition to C on the first step. Contrarily, if 'a' is the second step of a cycle, then there is no problem and no-slow-down is required because the A→B→C transitions naturally occur in separate cycles.

If a rule contains a long sequence of symbols or CCLs, such as "the_quick_brown_fox_jumped", for example, and each symbol is matched by a different cell, then the cell array will have to slow down to 1-symbol steps for the whole time during which a corresponding input string matches the rule. This type of slow-down may be acceptable in some situations in which such string matching is infrequent. The NFA cells may support complex NFA states, including complex states matching a sequence of symbols or symbol classes. Such slow-downs may be minimized by such. If cell A matches "the_quick_" and cell B matches "brown_fox_", then the internal matching in those cells can proceed at full N-step speed. There is a minimized danger, or none at all, of a transition into B triggering an out-transition in the same cycle for N<11. For N=2, the minimum N value above a single step, even if each cell only matches two symbols of the sequence ("the", "e_", "qu", etc.), no cell will ever try to out-transition due to an in-transition in the same cycle.

As another example, if a cell represents a complex state matching a spinner and the following CCL of the form "[S] {n,m} [A]", the cell takes at least n+1 steps from any in-transition to generate an out-transition. Accordingly, it will not cause slow-downs when n>N−2. Thus, cell architectures supporting complex states are useful in minimizing the potential of slow-downs.

Figure 2:
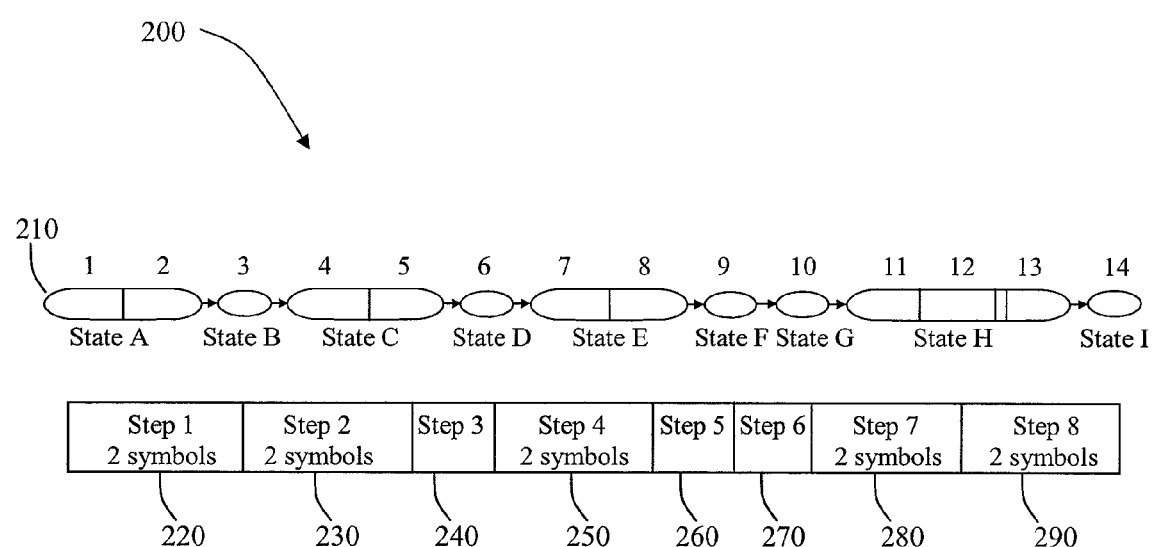
FIG. 2 is a sequence diagram of an embodiment of multi-step NFA matching.

FIG. 2 is a sequence diagram of an embodiment of multi-step NFA matching. The sequence 200 is a representation of a timeline of matching states A-I. A sequence of input symbol positions 210 are shown to correspond to the states A-I. There are symbol positions 1-14. The steps taken in the NFA cell array (steps 1-8) 220-290 are also shown to correspond to the states A-I. In the sequence 200 shown, N=2. For purposes of the example in FIG. 2, it is assumed that one (1) state is active at a time. It is understood that there may be many states in an NFA cell array that may be active at a single time. State A is active at symbol 1, and remains active when advancing to symbol 2, then transitions to state B on symbol 2 so that state B becomes active at symbol 3. So, in the first step, starting from symbol 1, in State A, a two symbol step is acceptable. This is because only 1 state transition occurs. So, in step 1 220 a two symbol step is taken and a transition is made to state B. State B is now active at symbol 3. State B transitions to State C at symbol 3, but no out-transition signal from state C occurs on symbol 4. Therefore another two symbol step is acceptable, and a two symbol step is taken in step 2 230, from symbol 3 to symbol 5. The third step begins at symbol 5 in state C. State C transitions to state D on symbol 5, and state D transitions to state E on symbol 6. There cannot be a 2-symbol step from symbol 5 to symbol 7 because that would include a chain of two state transitions, from state C to state D to state E. State C will get a hazard warning and will command a slow-down, so that step 3 240 is restricted to only a 1 symbol step. Step 4 accordingly begins at symbol 6 in state D, with the transition to state E still remaining. Because no further transition from state E occurs on symbol 7, a two symbol step is again acceptable; the slow-down imposed on step 3 240 is no longer required. Accordingly step 4 250 is a 2 symbol step from symbol 6 to symbol 8. For step 5, another chain of two state transitions is detected, from state E to state F on symbol 9, and from state F to state G on symbol 10. So, another slow-down is signaled because only one cell boundary can be crossed per cycle. Step 5 260 is a single symbol step to symbol 9. This step 5 260 slow-down does not clear immediately, because afterward there is still a two-transition chain from state F to state G to state H ahead. Another consecutive slow-down is signaled, and step 6 270 is another single symbol step to symbol 10. Two byes are consumed in Steps 7 280 and 8 290 because only one transition occurs from symbol 10 to 12, and from symbol 12 to 14.

The progression from symbol 1 to symbol 14 accordingly took 8 steps, which is 13 symbols consumed in 8 clock cycles, an average of 1.625 symbols per cycle in this example of FIG. 2. This average is greater than 1 symbol per cycle, because 2 symbol steps were taken whenever possible, but less than 2 symbols per cycle, because some slow-downs to 1 symbol steps were required. If fewer two-transition chains occurred, average speed would have been higher, possibly achieving the maximum speed of N=2 symbols per cycle. If more two-transition chains occurred, average speed would have been lower, possibly achieving the minimum speed of 1 symbol per cycle. In practice, average speed close to N=2 symbols per cycle, such as 1.9 symbols per cycle for example, is often achievable.

Each occupied NFA cell (occupied means that it is configured with at least a portion of an NFA state and perhaps with a complex NFA sub-graph), whether active or not, will perform its transition CCL comparisons at least 1 cycle earlier than it will use the results. This is pipelining, commonly used in logic design, involving temporally overlapped operations, so that although multiple clock cycles are taken to compare CCLs and use the results, nevertheless comparison operations occur every cycle, and using the results occurs every cycle, and the net rate of processing input symbols does not decrease. Each cell should receive input symbols earlier than their corresponding step cycles. If CCL comparisons are already pipelined 1 cycle early for internal timing purposes, they should be compared at least 2 cycles early. The results of these comparisons are used to determine whether an out-transition from the cell would be possible as a result of an in-transition at any of the N−1 previous input positions. For example, N=2, if a cell matches "[a-z] {0,3} [0-9]", the [0-9] transition CCL is compared early, and if it matches then an in-transition at the previous position causes an out-transition, because the [0-9] transition can occur immediately after an in-transition. By contrast, if N=2 and the cell matches "[a-z] {1,3} [0-9]", it would determine that an in-transition at the position before the [0-9] match could not cause an out-transition, because at least one [a-z] must match first. However, if N=3, and the cell matches "[a-z] {1,3} [0-9]" with the [0-9] CCL matching a future input symbol, an in-transition 2 symbols earlier may trigger an out-transition on the [0-9] match. Also, an early [a-z] comparison with the previous symbol position may also be considered. If [0-9] matches a future symbol position, and [a-z] matches the previous symbol position, then an in-transition at the position before that will lead to an out-transition at the [0-9] match position.

As discussed herein, a method and system of the invention may be a multiple step NFA match of input symbols in an NFA cell array. Consumption of at least two successive input symbols in a first clock cycle, comparing at least one symbol class with the two input symbols in a second clock cycle and receiving and emitting at least two output transition in a third clock cycle may comprise steps of, and enablement of, embodiments of the invention. These functions and steps may be pipelined as distinct clock cycles. These functions and steps may also be pipelined not as distinct clock cycles.

When an early determination is made that an in-transition at a future input position may cause an out-transition less than N symbols later, a cell will transmit this transition information to any parent states which are in the cell array. This information is known as a launch hazard. This is because if a parent state signals a transition to activate (launch) this cell at an indicated position, there is a risk (hazard) of triggering an out transition in the same cycle. For each input position X, launch hazard information comprises an indication of whether an in-transition at X might trigger an out-transition at X+1, X+2 . . . or X+N−1. This can be represented as N−1 bits. Since N symbols may be consumed per cycle at full speed, N future symbol positions must be considered each cycle by a cell. N corresponding launch hazards are communicated back to parent cells. Accordingly, if N=2, then two 1-bit launch hazards will be communicated to parent cells per cycle. This equals a total of 2 bits. If N=3, then three 2-bit launch hazards must be communicated. This equals a total of 6 bits. Communication to the parent cell may follow the same inter-cell signaling network used for transition signals from parent cells to child cells, with additional bit paths in the opposite direction. If a parent cell is connected to multiple child cells such that one out-transition signal will activate multiple child cells, then the launch hazard bits from the multiple child cells may advantageously be combined by OR gates, for example. This is because a launch hazard from any child cell will have the same effect in the parent cell. Communication of launch hazards from children to parents may take substantial time, which is a reason for initiating CCL comparisons early in the child cells.

In a parent cell receiving launch hazard signals, its own CCL comparisons are performed with input symbols. A parent cell may also be a child cell and these CCL comparisons are advantageously the same comparisons performed to generate launch hazards as a child cell, one or more cycles early, and registered for later use. By considering the status of the parent cell and the results of CCL comparisons, the parent cell determines and sends bundles of N transition signals to its child cell(s), as described above. For each transition signal sent, the parent cell will consult the corresponding launch hazard information, which will tell it whether this transition signal might trigger an out-transition from a child cell 1, 2 . . . N−1 positions later. Some of the later positions may fall outside the current N-step cycle because the transition signal being considered may not be at the first step in the cycle. Those launch hazard bits should be ignored. All N−1 launch hazard bits are sent for every position because it is not known beforehand how many steps will be taken in the cycles before they are used. If a transition signal is sent and a consulted launch hazard bit corresponding to a position inside the current cycle is active, this means that a slow-down is necessary in the current cycle. This is such that the symbol position corresponding to the active launch hazard bit is not consumed that cycle.

For example, we can make the following assumptions: a value of N=4 and a parent state making out-transitions for input positions X, X+1, X+2 and X+3. Also, it is assumed that the parent state makes a determination to send out-transitions at X+1, X+2 and X+3. The launch hazards for position X are ignored because no corresponding out-transition is being made. If the launch hazards for position X+1 are 3 bits, '0', '0', '1', which correspond to the next 3 positions X+2, X+3, X+4 respectively, since there is only a '1' at the X+4 position, it is ignored since it is outside the current cycle's step window. If the launch hazards for position X+2 are bits '1', '1', '0', only the first bit (for X+3) is inside the current cycle's step window so a slow-down is signaled. The current cycle must be only a 3-symbol step or less, so that position X+3 is not consumed. This slow-down is required because when the out-transition at X+2 is sent to the child state, the child state may need to make a resultant out-transition at X+3, as indicated by the '1' launch hazard bit sent received from that child state, and this chain of 2 transitions in a row is not permitted in a single cycle. The launch hazards for position X+3 are ignored because it is the last position in the current cycle's step window. None of its launch hazard bits are inside the window.

In the case of N=2, only a single launch hazard bit must be considered. If the current cycle step window is positions X and X+1, then only a first-step out-transition (position X) is risky and its launch hazard comprises a single bit corresponding to position X+1. If an out-transition at X is signaled, and the corresponding launch hazard bit is active, then the cycle must be slowed to a 1-symbol step.

Figure 3:
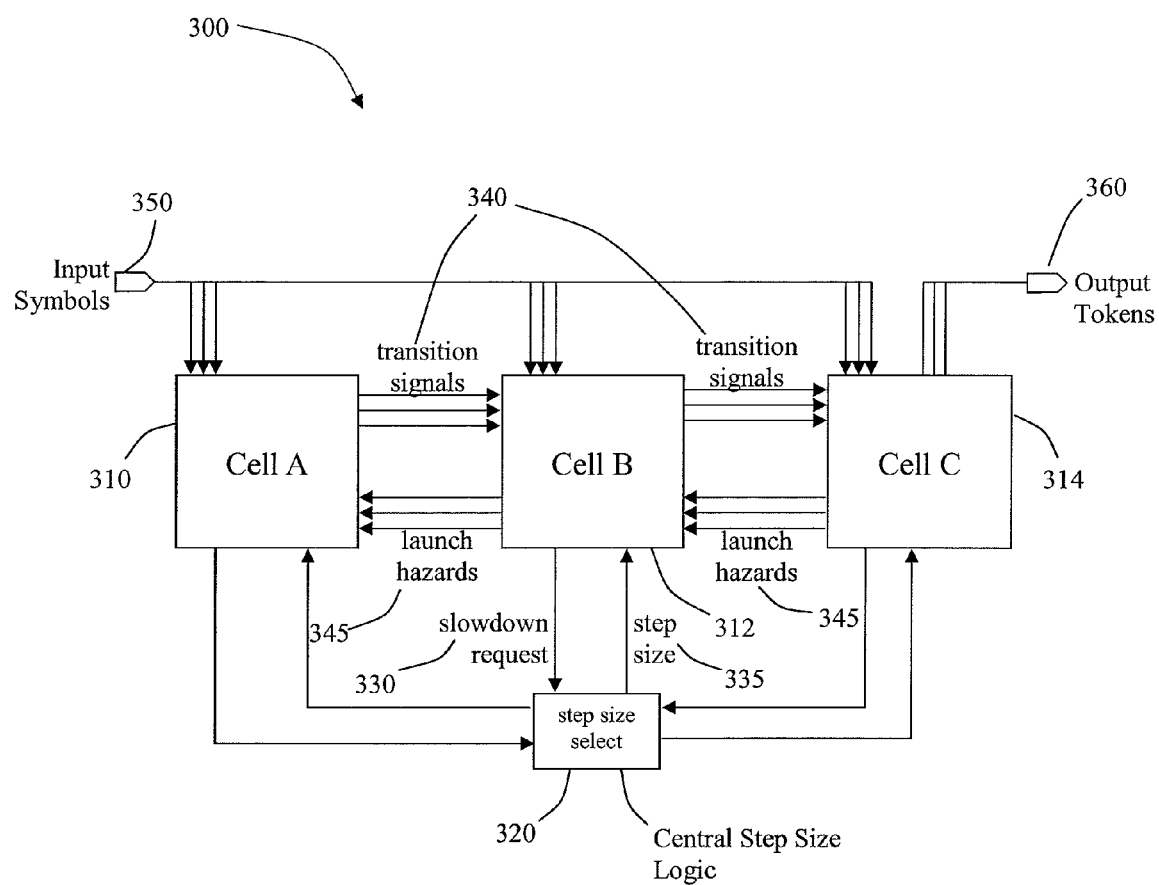
FIG. 3 is a block diagram of a cell array for multi-step NFA matching.

FIG. 3 is a block diagram of an embodiment of the invention of a multi-step NFA cell array. The multi-step NFA cell array 300 shows a cell A 310, a cell B 312 and a cell C 314. The three cells 310, 312, 314 all connect to a step size select block 320. The step size select block 320 is a logic utilized to centralize step size determinations. The step size select block 320 receives and sends signals to each of the cells 310, 312, 314 in the array 300. These signals may include step size 335 and slow-down request 330 signals. The step size signals 335 are signaled to the cells 310, 320, 330 by the step size select block 320. The slow-down request signals 330 are received by the cells 310, 320, 330 from the step size select block 320. Transition signals 340 are sent from parent states to child states and launch hazard signals 345 are also sent from child states to parent states. Input symbols 350 are multi-stepped into the cells 310, 312, 314 and tokens 360 are output from cell C 314. It is understood that tokens may be output from other cells (not shown).

Any (parent) cell in the array may signal that a slow-down is required. This slow-down must be applied to the current clock cycle. Slow-down request signals 330 must be gathered from all cells 310, 312, 314 and combined to determine the maximum allowable step size. The chosen step size must be communicated back to all cells within the same cycle. This gives the cells time to commit status updates corresponding to that step size. Due to the high fan-in and fan-out processing requirements of this type of slow-down communication, a majority of a clock cycle is required to manage the signals. Accordingly, launch hazards sent from child cells to parent cells are registered in the parent cells and are valid at the beginning of the "current" cycle to which they apply. Since out-transitions are also signaled at the beginning of the cycle, each cell's slow-down request can be determined early in the cycle. The slow-down requests 330 are represented as an N−1 bit vector. Each bit of the vector indicates if positions X+1, X+2 . . . must be excluded from the current cycle. The vectors received from all cells are OR'ed together for a cumulative result. The cumulative result can be communicated back to all cells after converting to a binary representation of a selected step size. It is understood that there may be many ways to logically combine the launch hazards from each cell, and to represent the selected step size.

Each NFA cell receiving the selected step size Z will update its status for a corresponding number of steps, which may be less than N. Only the first Z symbols are considered to be consumed; only the first Z in-transitions are acted on and only the first Z out-transitions are processed by destination cells. Only the first Z match or token signals from each cell may be considered valid. The input symbols presented to each cell the following cycle must be shifted by only Z symbols, not necessarily all N.

Utilizing methods of embodiments of this invention, the cell array can consume N symbols per cycle except for positions where A→B→C transition chain needs to be broken into multiple cycles. While any cell array may lose performance for various reasons, such as input or output congestion or instruction cache misses, a multi-step cell array also has performance loss issues. As stated, launch hazard slow-downs may occur. Slow-downs can be minimized by complex NFA cells representing multi-state sub-graphs where launch hazards might be eliminated. Also, filtering and look-ahead processing can reduce the average frequency of inter-cell transitions and may reduce the impact of launch hazard slow-downs. Increasing buffer and caches sizes may also be used to minimize congestion and cache misses.

A cell array upgrade to multiple symbols per cycle according to embodiments of the invention can be made without altering the construction of the NFA or generation of cell instructions. A pre-existing NFA is executed a higher speed.

Some applications may determine a necessary value for N out of necessity. When there is a range of values for N available, a number of factors can be considered. With increasing values of N, performance increases but logic complexity and area increase. Performance risks also increase. A best area to performance ratio may be achievable for different applications. A value of N=2 provides a good performance to area and logic ratio.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of multiple step non-deterministic finite automaton (NFA) matching of input symbols in an NFA cell array having a plurality of cells, the method comprising:
   consuming at least two successive input symbols in a first clock cycle of a clock signal at each cell in the plurality of cells;
   comparing at least one symbol class in a cell of the plurality of cells in a second clock cycle of the clock signal with the at least two successive input symbols;
   emitting at least two output transitions from the cell of the plurality of cells in a third clock cycle of the clock signal corresponding to successive symbol positions, said output transitions being destined to a same destination cell;
   performing status updates in the cell of the plurality of cells in the third clock cycle; and
   receiving at least two input transitions in the cell of the plurality of cells in the third clock cycle corresponding to successive symbol positions, said input transitions being received by the cell and from a same emitting cell.

2. The method of claim 1, wherein said NFA cell array is a dynamically configurable cell array.

3. The method of claim 1, wherein no state transition chain occurs from a first cell of the plurality of cells to a second cell of the plurality of cells to a third cell of the plurality of cells in any clock cycle.

4. The method of claim 1, wherein:
   said NFA cell array is a dynamically configurable cell array; and
   no state transition chain occurs from a first cell of the plurality of cells to a second cell of the plurality of cells to a third cell in any clock cycle.

5. The method of claim 1, wherein the step of emitting the at least two output transitions is independent of the step of receiving at least two input symbols.

6. The method of claim 5, wherein said NFA cell array is a dynamically configurable cell array.

7. The method of claim 6, wherein the step of emitting at least two output transitions occurs earlier in the third clock cycle than the step of receiving at least two input transitions.

8. The method of claim 1, wherein the step of emitting at least two output transitions occurs earlier in the third clock cycle than the step of receiving at least two input transitions.

9. The method of claim 8, wherein said NFA cell array is a dynamically configurable cell array.

10. The method of claim 1, said method further comprising:
    detecting in the cell array whether a match of a first symbol in a first state will cause a transition from a second state to a third state on a consecutive second symbol; and
    if said transition from a second state to a third state would occur, preventing consumption of the first and second symbol in the same clock cycle.

11. The method of claim 1, further comprising:
    comparing a symbol class in an NFA child cell with a future input symbol in advance;
    communicating a successful comparison of the future symbol to a parent cell, said parent cell detecting whether it matches a current input symbol, said match causing a transition to the child cell; and
    if the parent cell receives the signal indicating a match of the future symbol and matches the current symbol causing a transition to the child cell, preventing the future symbol from being consumed during the same clock cycle as the current symbol is consumed.

12. The method of claim 11, wherein said NFA cell array is a dynamically configurable cell array.

13. A system for multiple step matching of input symbols, comprising:
    a non-deterministic finite automaton (NFA) cell array, comprising a plurality of cells, enabled to:
    transmit bundles of multiple transition signals from a first set of cells of the plurality of cells to a second set of cells of the plurality of cells,
    compare character classes in each cell of the plurality of cells against multiple input symbols in parallel,
    generate out-transitions from each cell of the plurality of cells for multiple symbol steps in one clock cycle of a clock signal, and
    receive in-transitions into each cell of the plurality of cells for multiple symbol steps in one clock cycle of the clock signal; and
    a step size selector enabled to receive slow down requests from each cell of the plurality of cells to determine a proper step size for each clock cycle in the NFA cell array.

14. The system of claim 13, wherein said NFA cell array is a dynamically configurable cell array.

15. The system of claim 13, wherein:
    said NFA cell array is further enabled to compare future character classes early in the second set of cells to determine launch hazards, communicate the launch hazards to the first set of cells and generate the slow-down requests when the launch hazards correspond to out-transitions.

16. The system of claim 13, wherein:
    said step size selector is enabled to determine the proper step size by gathering all slow-down requests generated by each cell of the plurality of cells and signaling the proper step size to each cell of the plurality of cells, wherein each slow-down request comprises a maximum step size and the selector taking the smallest received step size and signaling said smallest received step size to each cell of the plurality of cells.

17. The system of claim 16, wherein the NFA cell array generates slow-down requests by comparison of received launch hazards with generated out-transitions in the first set of cells.

18. The system of claim 13, wherein the NFA cell array if further enabled to generate slow-down requests by comparison of received launch hazards with generated out-transitions in the first set of cells.

19. The system of claim 18, wherein each slow-down request comprises a maximum step size and the selector taking the smallest received step size and signaling said smallest received step size to each cell of the plurality of cells.

* * * * *